3,375,165
FUSIDIC ACID SALTS OF TETRACYCLINE BASES AND THERAPY

Guy Hagemann, Nogent-sur-Marne, and Lucien Penasse, Paris, France, assignors to Roussel-UCLAF, Paris, France, a corporation of France
No Drawing. Filed Aug. 11, 1964, Ser. No. 388,954
Claims priority, application France, Oct. 22, 1963, 951,378; Jan. 22, 1964, 961,175
6 Claims. (Cl. 167—65)

The present invention relates to a novel salts of fusidic acid and of antibiotics, as well as to a process for the preparation of these compounds, compositions containing them and their therapeutic utilization.

In particular, the invention relates to the salts formed from fusidic acid and antibiotics of the tetracycline group, such as chlorotetracycline, oxytetracycline, demethylchlorotetracycline, and especially tetracycline itself.

It is known that the fusidic acid, despite its satisfactory activity in vitro and in vivo on Gram positive bacteria and in particular on staphylococci only slightly sensitive to penicillin or to other antibiotics, has the disadvantage of giving rise to resistant strains rather fast, and in addition, its activity is exceedingly diminished in the presence of serum.

On the other hand, it is known that the association of the fusidic acid with certain antibiotics, for example of the macrolide group or of the penicillin group produces a synergetic effect.

This phenomenon is, however, not general, and the association of the fusidic acid with other antibiotics such as tetracycline does not bring about any particular advantage. The mixtures thus formed possess only the additive activity of the antibiotics which make up their composition (see especially Godtfredsen et al., Lancet, 1962, 1, page 928).

An object of the present invention is the production of a salt of fusidic acid and an antibiotic of the tetracycline group.

A further object of the invention is the development of a process for the production of a salt of fusidic acid and an antibiotic of the tetracycline group which comprises the steps of reacting fusidic acid with a compound of the tetracycline group in the form of its free base in an organic solvent and recovering said salt of fusidic acid and an antibiotic of the tetracycline group.

A further object of the invention is the development of a process for the production of a salt of fusidic acid and an antibiotic of the tetracycline group which comprises reacting a soluble salt of fusidic acid with a soluble salt of an antibiotic of the tetracycline group in the presence of a solvent in which the salt of fusidic acid and an antibiotic of the tetracycline group is insoluble and recovering said salt of fusidic acid and an antibiotic of the tetracycline group.

Another object of the invention is the obtension of a therapeutic composition comprising a minor amount of a salt of fusidic acid and an antibiotic of the tetracycline group and a major amount of an inert pharmaceutically acceptable excipient.

A yet further object of the invention is the development of a process for the treatment of bacilliary infections which comprises administering to the infected organism a safe but effective amount of a salt of fusidic acid and an antibiotic of the tetracycline group.

These and other objects of the invention will become more apparent as the description thereof proceeds.

We have found that salts formed between fusidic acid and antibiotics of the tetracycline group exhibit a remarkable antibiotic activity, superior to that of fusidic acid and the antibiotic of the tetracycline group, included in the salt.

In addition to this starting synergistic effect, the said salts, and more particularly the fusidic acid salt of tetracycline, are distinguished by a favorable tolerance, a very slight solubility in water and the absence of a bitter taste. The latter is unpleasant in pharmaceutical presentations in the form of granules, syrups, etc.

The process for the preparation of these compounds, which is also the subject of the present invention, is characterized principally in that fusidic acid is allowed to act on an antibiotic of the tetracycline group while operating in an organic solvent such as an alcohol, an ether, a ketone, an ester, or a chlorinated solvent.

The products, resulting from this process of preparation, are advantageously isolated either by precipitation by means of water, or by evaporation of the solvent or by adding a second organic solvent in which the salt of fusidic acid and an antibiotic of the tetracycline group are insoluble.

As a variant, these same compounds may be prepared by double decomposition between a soluble salt of fusidic acid, such as an alkaline metal or ammonium salt, and a soluble salt of an antibiotic of the tetracycline group, such as the hydrochloride or the sulfate, by advantageously utilizing as a reaction media either water or a water miscible solvent or any other media in which the initial salts are soluble and the salt formed is insoluble or may be rendered insoluble by the addition of a suitable diluent.

For the performance of the process for the preparation of the compounds of the present invention, it is advantageous to introduce approximately equimolecular quantities of the starting antibiotics. If a precipitation by a second organic solvent is to be effected, it is preferable to utilize an excess of fusidic acid. When effecting the process in the presence of an organic solvent, it is preferable to utilize an alcohol, such as the lower alkanols; an ether, such as a dialkyl ether, for example, ethyl ether, a cycloalkyl ether, for example, tetrahydrofurane, a cycloalkyl diether, for example, dioxane; a ketone, such as a lower alkanone, for example, acetone; an ester, such as the lower-alkyl lower alkanoates, for example, ethyl acetate; or a chlorinated solvent, such as a chlorinated lower alkane, for example, chloroform. When effecting the process of precipitating the salt of fusidic acid and an antibiotic of the tetracycline group from an organic solvent by means of an organic compound in which the salt is insoluble, it is preferable to utilize as such organic compound, an ether, such as a dialkyl ether for example isopropyl ether.

Fusidic acid and its soluble salts are described in United States Patent No. 3,072,531.

The terms "antibiotic of the tetracycline group" and "tetracyclines" as used herein include all antibiotics which have as the fundamental nucleus that of tetracene. These compounds include, but are not limited to, tetracycline, 5-oxytetracycline, 7-chlorotetracycline, 7-bromotetracycline, anhydrotetracycline, 6-deoxytetracycline, 6-demethyltetracycline, etc.

The invention is described in more detail in the examples with the preparation of the salt of fusidic acid and tetracycline, but it is evident that the process is applicable in the same manner to the preparation of the fusidic acid salts with other antibiotics of the tetracycline group.

The following examples are illustrative of the practice of the invention. It is to be understood, however, that they are not to be deemed limitative.

EXAMPLE I.—PREPARATION OF THE FUSIDIC ACID SALT OF TETRACYCLINE 516 mg. of fusidic acid and 444 mg. of tetracycline were dissolved in 10 cc. of acetone and the filtrate was concentrated to a low volume.

The solution was poured into water. The precipitate was filtered, washed with water and dried under vacuum. 607 mg. (yield; 63%) of the fusidic acid salt of tetracycline were obtained having a specific rotation $[\alpha]_D^{20}=-62°$ (c.=1 acetone).

The fusidic acid salt of tetracycline occurred in the form of light yellow microcrystals and was insoluble in water and isoproyl ether, slightly soluble in ethyl ether, and soluble in acetone, ethanol, chloroform, dioxane and tetrahydrofuran.

Ultraviolet spectra:

$$\lambda \text{ max.}=366 m\mu, E_{1 cm.}^{1\%}=148.4$$

$$\lambda \text{ max.}=264 m\mu, E_{1 cm.}^{1\%}=159$$

$$\lambda \text{ max.}=220 m\mu, E_{1 cm.}^{1\%}=235$$

Analysis ($C_{53}H_{72}O_{14}N_2$): Molecular weight=961.12. Calculated: C, 66.22%; H, 7.55%; N, 2.91%. Found: C, 66.2%; H, 7.7%; N, 2.7%.

This compound is not described in the literature.

EXAMPLE II.—PREPARATION OF THE FUSIDIC ACID SALT OF TETRACYCLINE 830 mg. of fusidic acid and 722 mg. of tetracycline were dissolved in 8.3 cc. of acetone and vacuum filtered. Then, slowly and under agitation, 41.5 cc. of water were added. The fusidic acid salt of tetracycline crystallized during the course of the introduction of the water. The precipitate was vacuum filtered, washed with water and dried under vacuum. 1360 mg. (yield; 88%) of the crystallized fusidic acid salt of tetracycline were obtained, identical to the product described in Example I.

EXAMPLE III.—PREPARATION OF THE FUSIDIC ACID SALT OF TETRACYCLINE

At reflux, 4.97 g. of fusidic acid and 4.27 g. of tetracycline were dissolved in 50 cc. of acetone. A limpid, yellow solution was obtained which was evaporated under reduced pressure until it started to solidify. Then, the pressure and the temperature were allowed to return to normal and the solid mass redissolved in the excess non-evaporated acetone. Next, the solution was evaporated under vacuum; 8 g. of fusidic acid salt of tetracycline were obtained, identical to the product described in Example I.

EXAMPLE IV.—PREPARATION OF THE FUSIDIC ACID SALT OF TETRACYCLINE 1 g. of tetracycline in basic form (2.25 mmols) and 6 g. of fusidic acid (11.62 mmols) were introduced in 8 cc. of peroxide-free dioxane. After total dissolution, 80 cc. of isopropyl ether were added and the solution was left at rest for a period of 15 minutes in order that the product precipitated entirely. The product was then filtered. 1.35 g. of the fusidic acid salt of tetracycline were thus obtained, the product being identical to that described in Example I, and having a specific rotation $$[\alpha]_D^{20}=-64\pm2°$$

(c.=1% acetone).

Analysis confirmed the presence of equimolecular quantities of fusidic acid and tetracycline in the product.

EXAMPLE V.—PREPARATION OF THE FUSIDIC ACID SALT OF TETRACYCLINE BY DOUBLE DECOMPOSITION 516 mg. of fusidic acid were placed in suspension in 10 cc. of water, and the stoichiometric amount of an aqueous solution of normal NaOH was added. Then, under agitation, 10 cc. of an aqueous solution of 480 mg. of tetracycline hydrochloride were added. The solution was allowed to stand at rest for a period of 12 hours, then the product formed was vacuum filtered, washed with water and dried under vacuum. 865 mg. (yield; 90%) of the crystallized fusidic acid salt of tetracycline were obtained, identical to the product described in Example I.

The fusidic acid salt of tetracycline presents in vitro, with reference to various strains of pathogenic staphylococci, a superior activity to that of either fusidic acid or tetracycline, which are used in its preparation. Even in the cases of strains resistant to penicillin, tetracycline or fusidic acid, the fusidic acid salt of tetracycline remains active at a very weak concentration.

As it has already been indicated, the fusidic acid salts of antibiotics of the tetracycline group possess interesting pharmacological properties. In particular they possess an important antibiotic and bactericidal action.

They can be used for the treatment of staphylococcal infections, streptococcal infections and infections caused by the Gram negative bacteria, as for example, the colibacilli, the typhoid bacilli and the pyocyanic bacilli.

The salt formed between fusidic acid and an antibiotic of the tetracycline group represents a distinct synergy, whose effectiveness has been clearly proven relative to numerous clinical strains either Gram positive or negative. The therapeutic effectiveness of the fusidic acid salt of an antibiotic of the tetracycline group, administered by mouth, is always superior to that of either of the two antibiotics included in the compound.

The fusidic acid salt of an antibiotic of the tetracycline group can be administered orally, perlingually, transcutaneously, or by the method of topic applications to the skin or to the mucous membranes, or rectally.

They can be prepared in the form of injectable solutions or suspensions, packed in ampoules and phials of multiple doses; in the form of pills, coated pills, aromatic powders, granules, emulsions, syrups, suppositories, ovules, intravaginal tablets, ointments, nose or ear drops, collutories or topical powders finely pulverized.

The useful dosology is controlled between 150 mg. and 600 mg. per dose and 500 mg. to 2 g. per day in the adult, as a function of the method of administration.

The pharmaceutical forms, such as injectable solutions or suspensions, tablets, coated pills, aromatic powders, granules, emulsions, syrups, suppositories, ovules, intravaginal tablets, ointments, nose or ear drops, collutories, topical powders finely pulverized, are prepared according to the customary processes.

In this way, for instance, the tablets may be prepared after micropulverizing and dilution with one or several inert excipients.

EXAMPLE VI.—PHARMACOLOGICAL STUDY OF THE FUSIDIC ACID SALT OF TETRACYCLINE (1) *Determination of the activity "in vitro"*

The comparative determinations were effected on a liquid media (Oxoid No. 2 media at a pH of 7.4) after an incubation time of 24 and 40 hours at a temperature of 37° C., with reference to various pathogenic strains obtained from samples taken from patients in different hospitals. The minimum inhibiting concentrations (in μg./cc.) observed for the strains studied are the following:

weaker than that of the fusidic acid salt of tetracycline in the normal testing media, is distinctly reduced in the presence of serum.

TABLE I.—(a) GRAM POSITIVE BACTERIA

| Strains (No. and origin) | Fusidic acid | | Tetracycline (hydrochloride) | | The fusidic acid salt of tetracycline | |
|---|---|---|---|---|---|---|
| | 24 h. | 40 h. | 24 h. | 40 h. | 24 h. | 40 h. |
| Staphylococcus aureus No. 586/63 poorly sensitive to penicillin | 0.1 | 0.1 | >20 | >20 | 0.1 | 0.1 |
| Staphylococcus aureus No. 10612 sensitive to penicillin | 20 | 20 | 0.2 | 0.5 | 0.2 | 0.5 |
| Staphylococcus aureus No. 11116 | 0.5 | 2 | 0.2 | 0.2 | 0.2 | 0.2 |
| Staphylococcus aureus No. S. 152 poorly sensitive to penicillin | 5 | 5 | >20 | >20 | 5 | 5 |
| Staphylococcus aureus No. S. 155 resistant to penicillin | 0.5 | 0.5 | >20 | >20 | 0.5 | 0.5 |
| Staphylococcus aureus No. S. 254 poorly sensitive to penicillin | 0.5 | 1 | >20 | >20 | 0.5 | 0.5 |

TABLE II.—(b) GRAM NEGATIVE BACTERIA

| Strains (No. and origin) | Fusidic acid | | Tetracycline (hydrochloride) | | The fusidic acid salt of tetracycline | |
|---|---|---|---|---|---|---|
| | 24 h. | 40 h. | 24 h. | 40 h. | 24 h. | 40 h. |
| Salmonella typhimurium No. 5939/62 | >40 | | 1.2 | 2 | 2 | 3 |
| Shigella sonnei No. 6418/62 | >40 | | 1 | 1.5 | 2 | 3 |
| Shigella flexneri No. 6732/62 | >40 | | ≤0.5 | | 0.5 | 1 |
| Escherichia coli No. 2534/63 | >40 | | 1 | 1.5 | 1.5 | 2 |
| Escherichia coli No. 5197/63 | >40 | | 1 | | 2 | 3 |
| Escherichia coli No. 3164/62 | >40 | | ≤0.5 | 1.5 | 1 | 2 |
| Klebsiella pneumoniae No. 10031 | 20 | 40 | ≤0.5 | ≤0.5 | ≤0.5 | 1 |

These results show that the composition of the fusidic acid salt of tetracycline, that is to say fusidic acid (53.8%) and tetracycline (46.2%) being taken into account, a synergistic effect is distinctly evident as concerning the activity of the fusidic acid salt of tetracycline aganist the various strains of staphylococci studied. In fact, the activity of the fusidic acid salt of tetracycline is superior to that which would be expected according to the activity of fusidic acid and of tetracycline, determined comparatively. In addition, the results show that for the strains of staphylococci resistant or poorly sensitive to fusidic acid, to tetracycline or to penicillin, the fusidic acid salt of tetracycline maintains an inhibitory action at low concentrations in all cases.

Against the Gram negative bacteria which are evidently not inhibited by fusidic acid at low concentrations (the antibacterian spectrum of this antibiotic is limited to the Gram positive bacteria only), the activity of the fusidic acid salt of tetracycline is slightly superior, with most of the strains, to that corresponding to the amount of tetracycline included in the compound, and the total inhibition is obtained already with very low concentrations.

(2) *The effect of human serum on the antibacterial activity*

In order to estimate the effectiveness of the fusidic acid salt of tetracycline in the presence of human serum, some determinations of activity were made on clinical strains of staphylococci and streptococci, in an Oxoid No. 2 media (pH=7.4), both with and without addition of 10% of human serum. The minimum inhibiting concentrations (in μg./cc.) were the following, after an incubation period of 24 hours at a temperature of 37° C.

TABLE III

| Strains | Fusidic acid | | The Fusidic acid salt of tetracycline | |
|---|---|---|---|---|
| | Without serum | With serum | Wishout serum | Wish serum |
| Staphylococcus aureus L.W. 59 | 0.2 | 5 | ≤0.5 | ≤0.5 |
| Staphylococcus aureus No. 369/63 | 0.2 | 3 | ≤0.5 | ≤0.5 |
| Staphylococcus faecalis No. P.C.I.M. 19 | 5 | >20 | ≤0.5 | ≤0.5 |

These results show that the activity of the fusidic acid salt of tetracycline is not modified in the presence of serum, whereas the activity of fusidic acid, already clearly (3) *Determination "in vivo" of the therapeutic effectiveness of the fusidic acid salt of tetracycline in experimental infections*

(a) Infection by a penicillin-sensitive Staphylococcus: Mice, divided into groups of 10 each, were infected by intraperitoneal administration of 0.30 cc. of a culture containing $10^{-2}$ of a Staphylococcus strain, TIN, sensitive to penicillin. For two days following, the fusidic acid salt of tetracycline, in comparison with fusidic acid and tetracycline, was administered orally (the first dose was given immediately after the inoculation, the second dose was given 16 hours later).

The therapeutic effect, determined according to the mortality of the animals and the size and number of the lesions, was as follows:

TABLE IV

| Product Administered | Dose (mg.) | Therapeutic action (percent) |
|---|---|---|
| The fusidic acid salt of tetracycline | 2 | 80 |
| | 3 | 94 |
| Fusidic acid | 2 | 53 |
| Tetracycline | 1 | 70 |

The synergistic effect of the fusidic acid salt of tetracycline (which contained only 46.2% of tetracycline) can be noted. Its therapeutic action is superior to that of fusidic acid or of tetracycline.

In a second test, two groups, each of 10 mice having an average weight of 23 g., were inoculated intravenously with 0.2 cc. of an 18-hour broth culture of a golden, hemolytic Staphylococcus (strain L.W.), which was totally inhibited by 0.1 μg./cc. of fusidic acid salt of tetracycline "in vitro." One of the groups served as control, the other received orally once a day for a period of 10 days, a total dose of 2.5 mg. per mouse, of the fusidic acid salt of tetracycline.

The animals were sacrificed on the 11th day.

During the first 12 hours, a state of prostration and raising of the hair was noticed in the control animals. All of the control animals showed large and numerous lesions, either unilateral or bilateral, of the kidneys, and a renal hypertrophia in 60% of the cases. Mortality was 60%. The treated animals showed a generally satisfactory aspect. No apparent renal lesions nor hypertrophia were noted. Mortality was nil. The tolerance remained excellent during the entire duration of the experiment.

The fusidic acid salt of tetracycline, at a daily dose of 108 mg./kg. in mouse, had thus an excellent therapeutic effect when administered orally in a serious Staphylococcus infection.

(b) Infection with a penicillin-resistant Staphylococcus: Groups, each of 10 mice, infected by introperitoneal administration with 1 cc. of a pure culture of Staphylococcus, strain BEN, cultured with musin. The products to be tested were administered orally on two consecutive days (the first dose immediately after the inoculation, the second dose 12 hours later).

Table V shows the results obtained.

TABLE V

| Product Administered | Dose (mg.) | Therapeutic action (percent) |
|---|---|---|
| The fusidic acid salt of tetracycline | 3 | 53 |
|  | .5 | 83 |
| Fusidic acid | 3 | 40 |
| Tetracycline | 3 | 18 |
|  | 1.5 | 8 |

These results show the very clear synergistic effect of the fusidic acid salt of tetracycline in a penicillin-resistant Staphylococcus infection.

(c) Infection with hemolytic streptococcus: Groups each of 10 mice were inoculated with a hemolytic Strepticoccus culture (strain M). After oral administration of the product for a period of 4 days, the following therapeutic effects were observed:

TABLE VI

| Product Administered | Dose (mg.) | Therapeutic action (percent) |
|---|---|---|
| The fusidic acid salt of tetracycline | 3 | 85 |
| Fusidic acid | 3 | 13 |
| Tetracycline | 3 | 79 |
|  | 1.5 | 59 |

Thus a good synergic effect of the fusidic acid salt of tetracycline was ascertained in a Streptococcus infection, where fusidic acid showed only a weak action and where tetracycline showed a therapeutic action inferior to that of the fusidic acid salt of tetracycline.

(d) Infection with Colibacillus: Groups, each of 10 mice, were inoculated with a culture of *Escherichia coli* (STAR strain). Then, a single dose of the fusidic acid salt of tetracycline was orally administered, in comparison with fusidic acid and tetracycline administered under the same conditions. The obtained therapeutic effects are given in Table VII below:

TABLE VII

| Product Administered | Dose (mg.) | Therapeutic action (percent) |
|---|---|---|
| The fusidic acid salt of tetracycline | 3 | 75 |
| Fusidic acid | 3 | 0 |
|  | 5 | 0 |
| Tetracycline | 1.5 | 68 |

From these results it can be noted that in this infection, caused by a Gram negative bacteria, insensitive to fusidic acid even at a dosage of 5 mg./kg., the fusidic acid salt of tetracycline performed a good therapeutic effect, slightly superior to that one corresponding to the tetracycline contained in the compound.

(e) Infection with typhoid bacillis: Groups each of 10 mice, inoculated with a culture of *Salmonella typhosa* (strain of clinical origin), were utilized. The fusidic acid salt of tetracycline was administered orally for two consecutive days. The observed therapeutic effect, compared to that of fusidic acid and tetracycline, was as follows:

TABLE VIII

| Product Administered | Dose (mg.) | Therapeutic action (percent) |
|---|---|---|
| The fusidic acid salt of tetracycline | 5 | 86 |
| Fusidic acid | 5 | 9 |
| Tetracycline | 2.5 | 76 |

These results showed that, in this infection caused by a Gram negative bacteria, practically insensitive to fusidic acid even at a dosage of 5 mg., the fusidic acid salt of tetracycline exhibited a good therapeutic action, superior to that of the tetracycline contained in the compound.

(f) Infection with pyocyanic bacilli: Groups each of 10 mice were inoculated with a pathogenic culture of *Pseudomonas aeruginosa*. The fusidic acid salt of tetracycline was administered orally for two consecutive days. The observed therapeutic effect, in comparison with fusidic acid and tetracycline, was compiled in Table IX:

TABLE IX

| Product Administered | Dose (mg.) | Therapeutic action (percent) |
|---|---|---|
| The fusidic acid salt of tracycline | 2 | 93 |
| Fusidic acid | 2 | 0 |
| Tetracycline | 1 | 72 |

These results showed that, in this infection caused by a Gram negative bacteria insensitive to fusidic acid, the fusidic acid salt of tetracycline exhibited a good therapeutic action, superior to that of the tetracycline contained in the compound.

In summary, it was noted that the fusidic acid salt of tetracycline, administered orally, showed a very good activity "in vitro" against numerous clinical Gram positive or Gram negative strains, with a distinct synergic effect with reference to the fusidic acid and the tetracycline incorporated in the salt (53.8% and 46.2% respectively) in the case of Gram positive bacteria, and an action superior to that of tetracycline in the case of Gram negative bacteria. "In vivo," the effectiveness of the fusidic acid salt of tetracycline, orally administered, was always superior to that of the two antibiotics included in the salt.

DETERMINATION OF THE TOXICITY (1) *Acute toxicity.*—The fusidic acid salt of tetracycline was administered orally, in aqueous suspension, in a concentration of 100 mg./cc., at doses of 200, 500, 1000, 2000, and 5000 mg./kg., to groups, each of 10 mice. The animals were held under observation for one week. No symptomatology was noted. The $DL_{50}$ was greater than 5 g./kg. under experimental conditions.

(2) *Semi-chronic toxicity.*—The fusidic acid salt of tetracycline was administered orally to groups, each of 10 rats, at doses of 100, 200, and 500 mg./kg. daily, for a period of two weeks. No mortality was noted. After autopsy, no organic anomaly was observed. Examination of the stomachs revealed nothing abnormal. The weight of the kidneys and of the suprarenals was practically identical to that of the corresponding organs of the control animals. The rats showed a very satisfactory overall condition during the entire duration of the experiment, and the average weight of the treated animals was practically identical with that of the control animals.

The fusidic acid salt of tetracycline was consequently very well tolerated even at a daily dose of 500 mg./kg. in the semi-chronic test with rats.

CLINICAL EFFECTIVENESS

The clinical tests over a period of several months, carried out on a large number of patients in different hospitals, demonstrate that the fusidic acid salt of tetracycline was always perfectly tolerated in the form of tablets containing 250 mg. of the fusidic acid salt of tetracycline at a daily dose of 6 to 8 tablets for adults, and at a dose of 50 mg./kg. for infants. The clinical results, in various infections, were on the whole very satisfactory. With 40 patients treated with 1.5 to 2 g. per day, the clinical effectiveness was considered as excellent, and for 6 patients suffering from infections caused by bacteria resistant to the tetracycline, recovery was obtained without difficulty. The blood levels determined after administration of 500 mg. of the fusidic acid salt of tetracycline were elevated and constant (as an average they corresponded to 9 µg./ml. at the second hour and to 6 µg./ml. at the fourth hour, expressed as micrograms of the fusidic acid salt of tetracycline per ml. of serum). In addition, due to the rather slow elimination of this antibiotic, the blood levels were very prolonged. Thus, after three administrations of 500 mg. each, spaced in periods of seven hours during the first day, blood levels of the order of 4 µg./ml. could be still observed ten hours after the third administration. At this level the therapeutic value is positive.

The preceding examples are illustrative of the invention. It is to be understood however that other expedients known to those skilled in the art, such as preparing salts of fusidic acid with antibiotics of the tetracycline group, other than tetracycline, may be followed without departing from the spirit of the invention or the scope of the appended claims.

We claim:
1. A salt of fusidic acid and the free base form of an antibiotic of the tetracyclic group.
2. The fusidic acid salt of tetracycline.
3. A therapeutic composition comprising from 150 mg. to 600 mg. of the fusidic acid salt of tetracycline and a major amount of an inert pharmaceutically acceptable excipient.
4. A process for the treatment of bacilliary infections which comprises administering to the infected organism a safe but effective amount of a salt of fusidic acid and the free base form of an antibiotic of the tetracycline group.
5. A process for the treatment of bacilliary infections which comprises administering to the infected warm-blooded animal from 500 mg. to 2 gm. a day of the fusidic acid salt of tetracycline.
6. A method of producing augmented antibacterial activity against strains of Staphylococcus bacteria which are resistant to fusidic acid and tetracycline which comprises contacting said bacteria with a salt of fusidic acid and the free base from an antibiotic of the tetracycline group, until more antibacterial activity against said bacteria is demonstrated than from either the corresponding antibacterial activity obtainable from either of said constituent members when used alone in corresponding amounts or the corresponding antibacterial activity obtainable from the corresponding amount of both constituents when used as an admixture.

References Cited

UNITED STATES PATENTS

| | | | |
|---|---|---|---|
| 2,824,877 | 2/1958 | Cheney et al. | 260—306.7 |
| 2,837,513 | 6/1958 | Gailliot et al. | 260—239.1 |
| 3,072,531 | 1/1963 | Godtfredsen et al. | 167—65 |
| 3,205,135 | 9/1965 | Tybring | 167—65 |
| 3,218,335 | 11/1965 | Scevola | 260—326.3 |

FOREIGN PATENTS 772,573  4/1957  Great Britain.

OTHER REFERENCES

Lancet: 928–937, May 5, 1962.
Lancet: 478–480, Sept. 8, 1962.
Smith et al.: "Development of Resistance to Fusidic Acid During Treatment of Nasal Carriers of Staphylococci," pp. 155–159, Antimicrobial Agents and Chemotherapy, 1962.

LEWIS GOTTS, *Primary Examiner.*

S. K. ROSE, *Assistant Examiner.*